United States Patent [19]

Codde

[11] Patent Number: 5,131,523
[45] Date of Patent: Jul. 21, 1992

[54] SLIDE TRANSFER

[75] Inventor: Christopher L. Codde, Coarsegold, Calif.

[73] Assignee: FMC Corporation, Chicago, Ill.

[21] Appl. No.: 696,421

[22] Filed: May 6, 1991

[51] Int. Cl.⁵ .................................... B65G 47/26
[52] U.S. Cl. ........................ 198/457; 198/482.1; 53/252
[58] Field of Search ........... 198/432, 456, 457, 482.1; 53/251, 252

[56] References Cited

U.S. PATENT DOCUMENTS

| | | | |
|---|---|---|---|
| 2,687,202 | 8/1954 | Nordquist et al. | 198/482.1 |
| 2,775,335 | 12/1956 | Simpson | 198/482.1 |
| 3,409,115 | 11/1968 | Porcaro | 198/456 |
| 3,604,319 | 9/1971 | Hirahara | 198/482.1 |
| 4,028,866 | 6/1977 | Langen | 53/252 |
| 4,214,663 | 7/1980 | Schopp et al. | 198/456 |
| 4,738,083 | 4/1988 | Kawai et al. | 53/252 |
| 4,817,779 | 4/1989 | Beck et al. | 198/457 |
| 5,040,662 | 8/1991 | Clark et al. | 198/408 |

Primary Examiner—Joseph E. Valenza
Attorney, Agent, or Firm—A. J. Moore; R. C. Kamp; R. B. Megley

[57] ABSTRACT

An apparatus and a method of conveying, queuing and transferring articles laterally in a direction different from the original direction of conveyance utilizing a cam means to harness the movement of an indexing conveyor system.

7 Claims, 4 Drawing Sheets

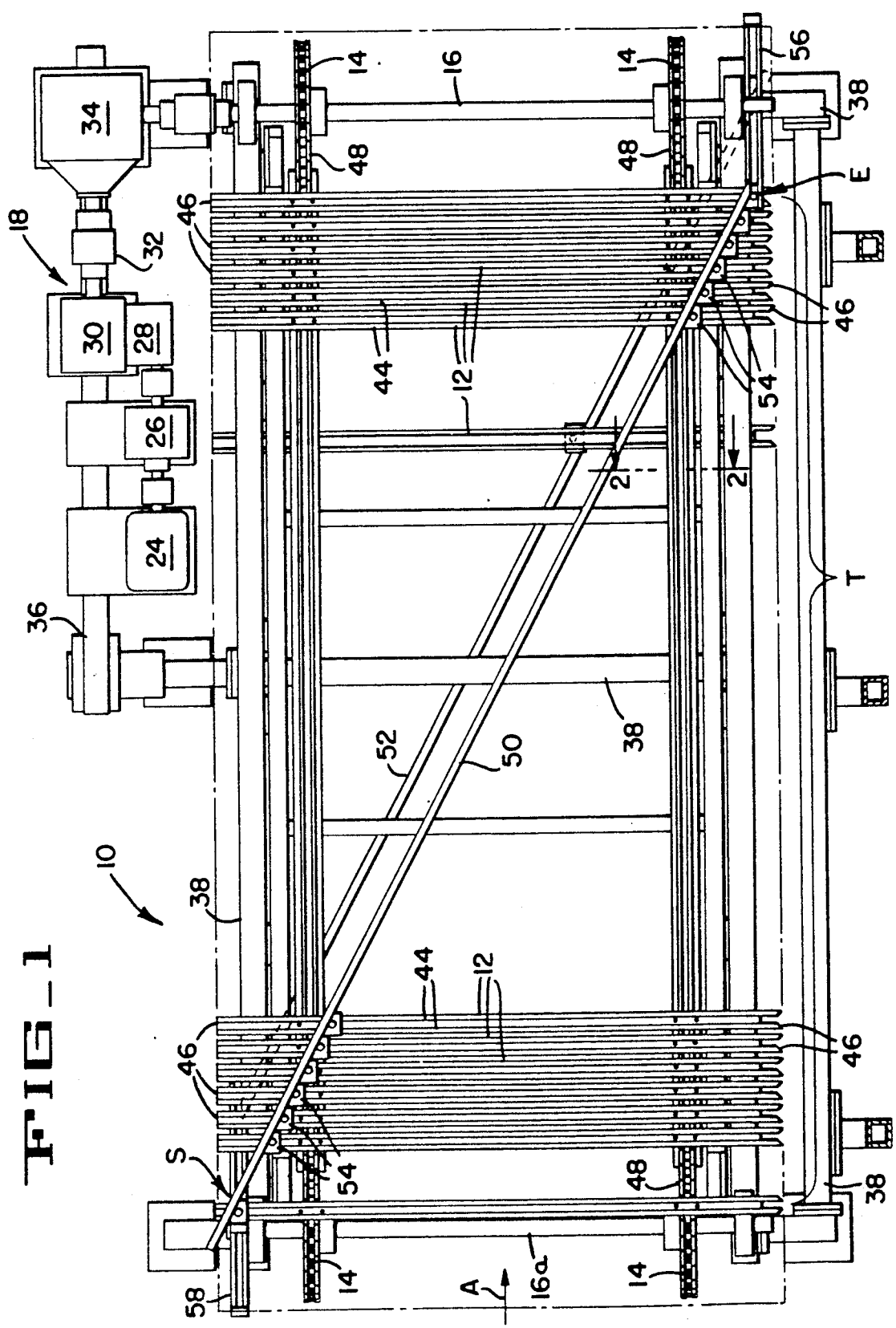

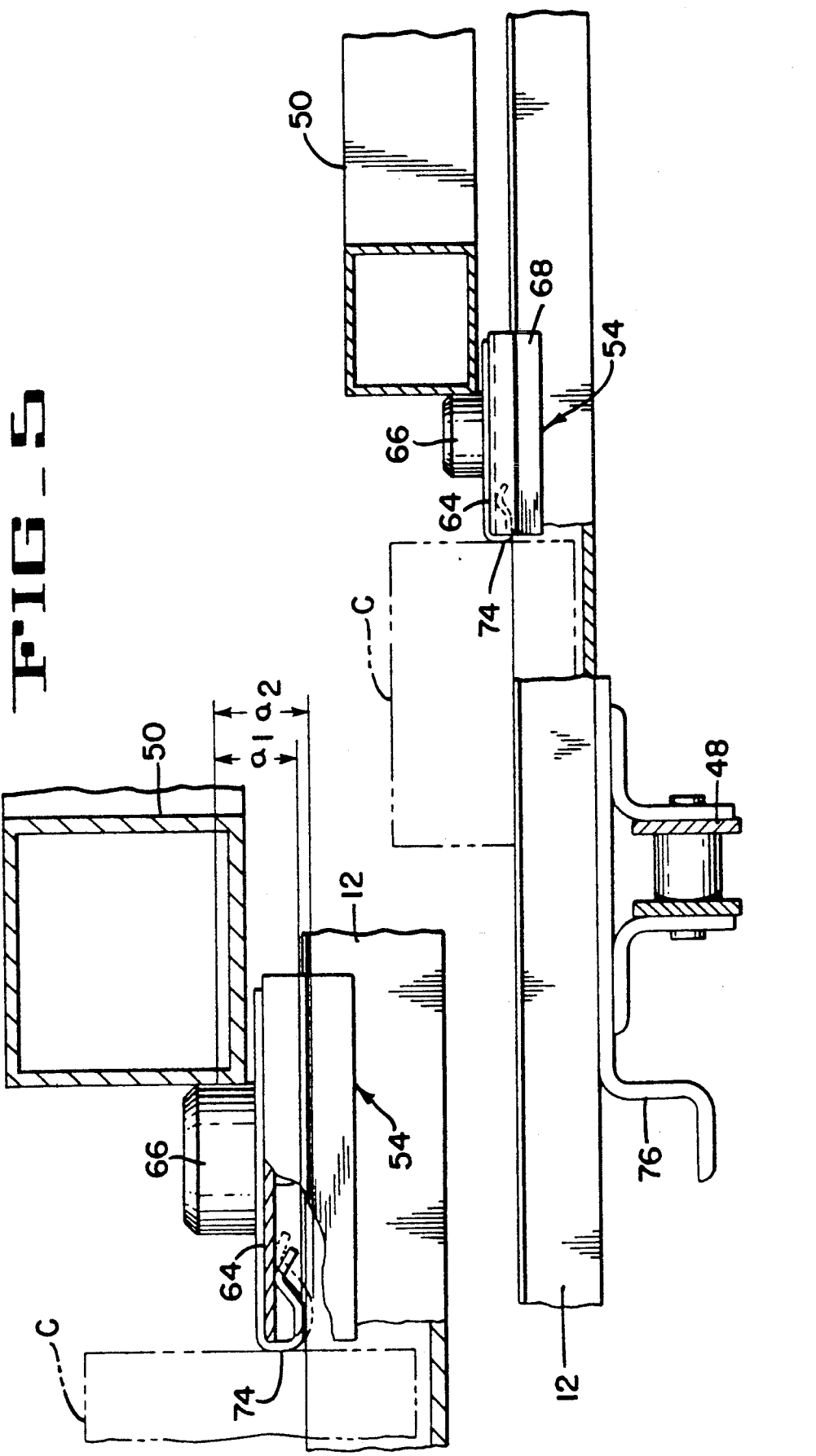

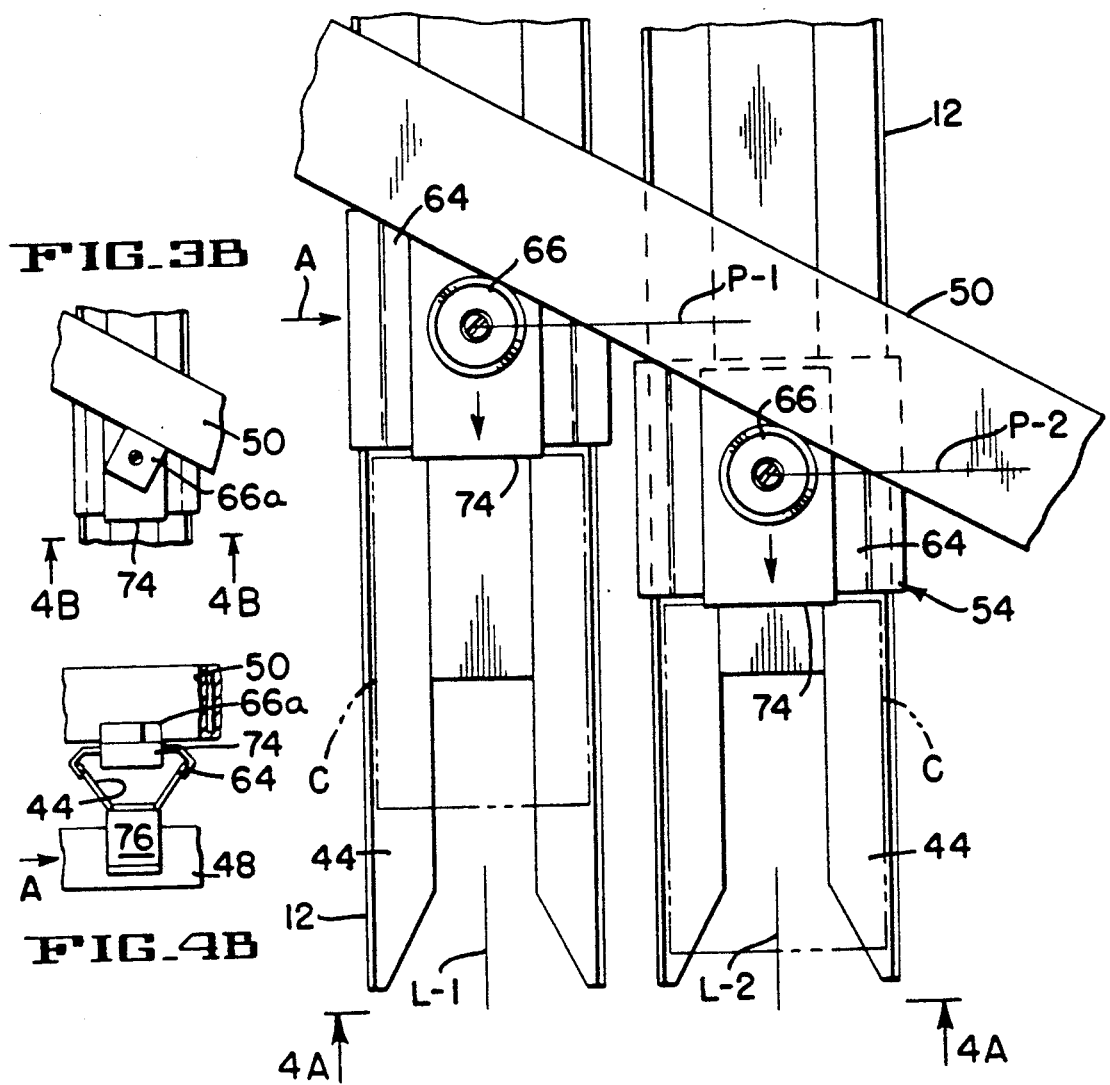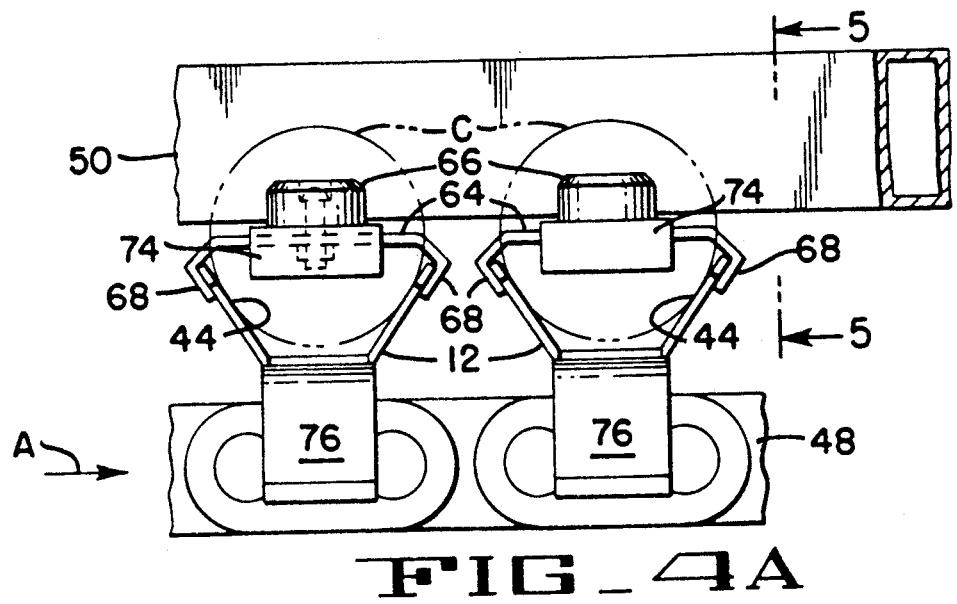

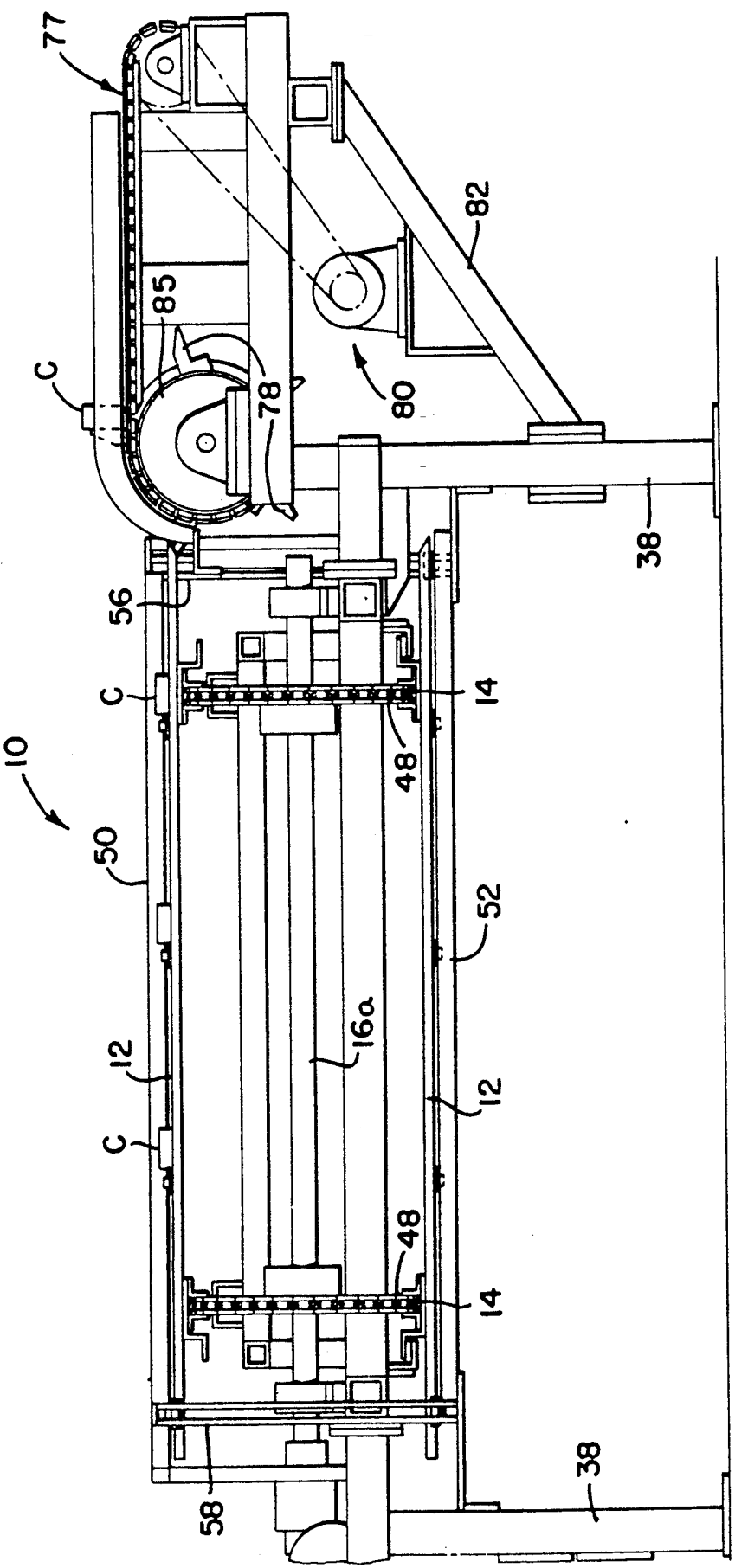
FIG_6

5,131,523

SLIDE TRANSFER

BACKGROUND OF THE INVENTION

1. Field of the Invention

The present invention relates to apparatus for reliably conveying, queuing and transferring articles such as jars, cans and other containers from one conveying path to another while changing the direction of conveyance of the articles during the transfer. Furthermore, the invention relates to apparatus for laterally conveying, queuing and transferring articles placed in a horizontal or vertical orientation relative to another conveyor, which has means to pick up the articles and align them in the same or different orientation, for processing, packaging, assembly and storage, or the like.

2. Description of the Prior Art

Assignee's Clark, A.C. et al application Ser. No. 07/540,987 filed Jun. 20, 1990 discloses a method and apparatus which cooperates with the disclosed invention and which is used for erecting and transferring containers such as jars, cans and other cylindrical articles having at least one flat end from a horizontal position to an upright position on one end for storage and packaging, or the like. Conveying systems which transfer articles therefrom through the use of reciprocating plungers or air blasts are known in this art.

SUMMARY OF THE INVENTION

The present invention pertains to apparatus for conveying, queuing and transferring articles while changing the direction of conveyance of the articles. The apparatus comprises a conveyor for conveying the articles which are supported on a carrier means secured to the conveyor. Further, a first cam means, which overlies the conveyor, is adjustably placed in a stationary position. Similarly, a second cam means, underlying the conveyor, is adjustably placed in a stationary position. As the conveyor advances, a slide means mounted on top of the carrier means comprising a spring member slidably comes in contact with the articles on the carrier means. In particular, the slide means pushes against the first cam means and moves from a start position to an end position on the carrier. The second cam means is used to urge the slide means from the end position back to the start position. Consequently, the slide means is urged to laterally and travel repeatedly from the start position to the end position on the conveyor.

BRIEF DESCRIPTION OF THE DRAWINGS

FIG. 1 is a plan view of one embodiment of the present invention.

FIG. 2 is a fragmentary section taken along the line 2—2 of FIG. 1.

FIG. 3A shows the slide means and stationary cam in one embodiment of the invention.

FIG. 3B shows an alternate slide means and stationary cam in one embodiment of the invention.

FIG. 4A is a view along the line 4—4 of FIG. 3A.

FIG. 4B is a view along the line 4—4 of FIG. 3B.

FIG. 5 is a fragmentary section taken along the line 5—5 of FIG. 4.

FIG. 6 shows containers being queued and transferred from the present invention to another cooperating conveyor.

DESCRIPTION OF THE PREFERRED EMBODIMENT

The apparatus of the present invention comprises an indexing conveyor 10 (FIG. 1) on which a multiplicity of carrier means 12 are securely mounted. The conveyor 10 is trained around sprockets 14 secured to a shaft 16. The shaft 16 is driven by the drive assembly 18 comprising a motor 24, clutch brake 26, indexing gear box 28, cam box 30, synchronizer coupling 32 and a right angle gear box 34. Drive assembly 18 is mounted on a drive assembly support structure 36. Particularly, the drive assembly 18 enables indexing of conveyor 10 such that an intermittent movement of the conveyor 10 is possible. The conveyor 10 and drive assembly 18 are jointly supported by a support structure 38. Although the art of indexing conveyors is not new, as explained in detail below, the present invention utilizes this feature to enable queuing of articles while the articles are being transferred laterally to another cooperating conveyor.

As illustrated in FIGS. 1, 4 and 6, each carrier means 12, has a wide generally U-shaped inner portion 44 to support articles that are being conveyed. Further, the carrier means 12, has open ends 46 to allow the lateral ingress and egress of the articles. Additionally, each carrier means 12 is connected to two endless chains 48 in conveyor 10, thus enabling the carrier means 12 to move endlessly along the upper reach of conveyor 10 in the direction of the arrow "A" in response to the intermittent movement of the sprockets 14 and the shaft 16.

An important feature of the invention is the use of a pair of stationary cam means or cam bars 50 and 52 (FIG. 1) for contacting and urging slide means 54 (FIG. 1) to move laterally from a start position "S" to an end position "E". Both cam bars 50 and 52 are adjustable in stationary position. One of the cam bars 50 is positioned overlying the upper run of conveyor 10 whereas the other cam bar 52 is placed underlying the conveyor 10 at the bottom run. As the carrier means 12 indexes forward, the slide means 54 comes in contact with the upper cam bar 50 and is urged to move forward and laterally from the start position "S" to the end position "E" as shown in FIG. 1. The slide means 54 rides an arcuate downward guide 56 (FIG. 1) at end position "E" where the upper cam bar 50 ends. Accordingly, the slide means 54 is guided downward to the lower run and moves into contact with the lower cam bar 52 where it is pushed back from the end position "E" to the opposite side of conveyor 10. At the end of the lower cam bar 52, the slide means 54 begins to ride an arcuate upward slide guide 58 which guides the slide means 54 upwards to the upper run of conveyor 10, and eventually moves it back adjacent to the start position "S". In this manner, the slide means 54 is urged to repeatedly travel from the start position "S" to the end position "E".

As best shown in FIG. 2, the slide means 54 is slidably secured on the carrier means 12 as conveyor 10 moves forward. The upper cam bar 50, which is fixed relative to the framework 38 (FIG. 1) supporting conveyor 10, comes in contact with and pushes against the slide means 54. Particularly, since the upper cam bar 50 angularly extends across the conveyor, it urges the slide means 54 to move laterally forward. The slide means 54 in turn pushes against an article "C" which is supported on carrier 12. Consequently, every forward movement of the conveyor 10 results in a forward advance and lateral displacement of article "C" on the carrier 12.

Furthermore, by indexing the conveyor 10 using the drive assembly 18 (FIG. 1), conveyor 10 moves intermittently. This results in article "C" moving intermittently as well. Thus, the movement of conveyor 10 and the cooperative push of the slide means 54 against the articles provides a forward and lateral displacement of the articles and the indexing of conveyor 10 results in the interruption of the forward and lateral displacement of articles such that the articles are queued for lateral transfer across the width of conveyor 10. Accordingly, the intermittent movement of the articles "C" enables individual or a composite group of articles to advance separately in a row along the width of conveyor 10 at transfer positions "T" delineated by the space between the start position "S" and end position "E" (FIG. 1), thus resulting in the queuing of the articles.

As mentioned hereinbefore and as best shown in FIG. 3A, as the conveyor 10 moves in the direction of the arrow "A" as shown, the slide means 54 not only advances forward from position P-1 to P-2 but also moves laterally from position L-1 to L-2. Thus, articles that are supported on the carrier means 12 are not only conveyed forward but are moved laterally as well. One of the advantages of this invention is therefore the use of a stationary cam bar such as the upper cam bar 50 to apply a linear force to a slide means 54 so that articles are conveyed both in a lateral and forward direction. Furthermore, since the invention enables the use of a linear force derived from the movement of the conveyor 10, the need for mechanically operated pushers, which usually require the expenditure of energy to accomplish a return stroke, is eliminated. The elimination of a return stroke reduces the likelihood of articles "C" being damaged from the impact of reciprocating pushers. The absence of a return stroke further provides higher operating speeds at a lower level of energy consumption. In particular, this invention enables the use of a conveyor system such as conveyor 10, to gently convey articles both in a forward and lateral direction without additional mechanical drives and motors. FIG. 3B shows an alternate embodiment in which the slide means 54 has a different configuration.

Referring now to FIG. 4A, a detailed embodiment of the slide means 54 is shown in close proximity with the upper cam bar 50. The slide means 54 comprises a generally flat top plate 64 to which a drive roller 66 is attached. Further, the slide means 54 includes depending side members or side skirts 68 which are shaped to slidably engage the slide means 54 on top of the carrier means 12. Additionally, the slide means 54 comprises a spring or pusher member 74 to gently contact and urge containers or articles "C" without imparting a damaging impact to them. As best shown in FIG. 5, the pusher member 74 is located on the frontal end of the slide means 54 which comes in direct contact with the articles "C" located on the carrier 12. Moreover, part of the spring or pusher member 74 is bent and curled back up against the bottom of the generally flat top plate 64. As discussed in more detail below, this arrangement enables the assembly to have a spring action such that as the slide means 54 pushes a variable size column of articles on the carrier 12, the pusher member 74 imparts a gentle linear force. FIG. 4B shows an alternate embodiment in which the drive roller 66 is replaced by an adjustable plate 66b attached to the flat top plate 64.

Referring now to FIGS. 4 and 5 in more detail, the slide means 54 is shown mounted on the carrier 12. Further, each carrier 12 is securely attached to the endless chain 48 by means of a clip angle 76 (FIG. 4). The mode of operation of the assembly cooperatively works as follows. When the conveyor 10 moves, the carriers 12, which are securely fastened to the endless chain 48, move forward. Accordingly, the slide means 54 which are slidably mounted on top of the carrier 12 advance forward as well. Since the upper cam bar 50 is fixed and the conveyor 10 moves relative thereto, the slide means 54 comes in contact with the upper cam bar 50 at a start position "S" (FIG. 1). More particularly, as the conveyor 10 advances, the slide means 54 is pushed laterally forward by the engagement of the drive roller 66 with the upper cam bar 50. This embodiment enables an efficient transmittal of linear forces to the slide means 54 through the use of rolling friction. The forces thus imparted to the slide means 54 are transmitted to the containers "C" which are located on the carrier 12. Initially, one carrier 12 may be carrying a number of containers. However, as the conveyor 10 advances forward, the containers "C" are pushed by the pusher member 74 (FIG. 5) and are eventually transferred laterally. Consequently, the load that is being pushed by the pusher member 74 is variable. To accommodate this variable load, the pusher member 74 acts as a spring and cushions the load.

Referring now to FIG. 6, the conveyor 10 is shown transferring containers onto another conveyor 77 with erector fingers 78. The other conveyor 77 with erector fingers 78 is similar to the conveyor described in the prior art section of this disclosure (Clark et al application). By coordinating the timing of the conveyor 10 with the conveyor 77 articles are queued and transferred one at a time. As best shown in FIG. 6, the conveyor 10 is shown adjacent to another conveyor 77 with erector fingers 78. The fingers 78 are trained around a pair of sprockets 85 and deliver articles "C" onto an upper run of the conveyor 77 by means of the erector fingers 78. The conveyor 77 with erector fingers 78 has its own drive means 80 and is supported by support structures 82 which in turn is attached to the support structure 38 of the conveyor 10.

Articles or containers "C" are shown being transferred on to the conveyor 77 with erector fingers 78, for example, in an initially horizontal or vertical orientation (FIG. 6 shows transfer in a horizontal position), to be picked up and positioned as needed, one at a time. Although the embodiment disclosed herein enables the queuing of articles without the need for another conveyor system, with the arrangement shown herein, articles are not only conveyed, laterally transferred and queued but their orientation may be changed by a cooperating conveyor such as conveyor 77, to match a required orientation for packaging, storage, assembly and the like.

It should be noted that conveyor 10 may be operated without indexing. When conveyor 10 is not indexed, articles are continuously conveyed and laterally transferred along the side of conveyor 10. Additionally, the cooperating conveyor may be another conveyor such as conveyor 77 or any other conveyor that is positioned along the side of conveyor 10 to accept articles that are being laterally transferred.

While the significant aspects of the invention have been shown and described with reference to a preferred embodiment, it will be understood by those skilled in the art that the foregoing and other changes in the form and details may be made therein without departing from the scope and substance of the invention.

What is claimed is:

1. An apparatus for conveying, queuing and transferring articles and changing the direction of conveyance of the articles during the transfer comprising:

conveyor means for conveying said articles; carrier means secured to said conveyor means for supporting said articles;

first cam means overlying said conveyor means; second cam means underlying said conveyor means; and slide means comprising a spring member slidably mounted on top of said carrier means for contacting the articles and being urged by said first and second cam means, to repeatedly travel laterally from a start position to an end position on said conveyor means.

2. An apparatus according to claim 1 wherein said carrier means is generally U-shaped in cross section.

3. An apparatus according to claim 1 wherein said first cam means overlying said conveyor means is adjustable in place and extends angularly across said conveyor means.

4. An apparatus according to claim 1 wherein said second cam means is adjustable in place and is spaced under said conveyor means and extends angularly below said conveyor means.

5. An apparatus according to claim 1 wherein said slide means comprises a generally flat top and depending side members for slidably engaging said carrier means.

6. An apparatus according to claim 5 wherein said slide means further comprises a drive roller rotatably attached to said generally flat top and rotatably engages said first and second cam means.

7. An apparatus according to claim 1 wherein said spring member further comprises a pusher surface to gently contact and urge said articles supported on said carrier means whereby said articles are laterally urged without imparting a damaging impact.

* * * * *